(12) United States Patent
Watanabe et al.

(10) Patent No.: US 7,734,376 B2
(45) Date of Patent: Jun. 8, 2010

(54) HAND AND HANDLING ROBOT

(75) Inventors: Atsushi Watanabe, Tokyo (JP);
Kazunori Ban, Yamanashi (JP); Taro Arimatsu, Yamanashi (JP); Masaru Oda, Yamanashi (JP); Yoshinori Ochiishi, Yamanashi (JP); Hiroaki Kubota, Fujiyoshida (JP)

(73) Assignee: Fanuc Ltd, Yamanashi (JP)

( * ) Notice: Subject to any disclaimer, the term of this patent is extended or adjusted under 35 U.S.C. 154(b) by 1103 days.

(21) Appl. No.: 11/365,601

(22) Filed: Mar. 2, 2006

(65) Prior Publication Data
US 2006/0200274 A1    Sep. 7, 2006

(30) Foreign Application Priority Data
Mar. 3, 2005    (JP)    ............... 2005-058810

(51) Int. Cl.
*G06F 19/00* (2006.01)
(52) U.S. Cl. .................................... 700/245
(58) Field of Classification Search .................. 700/245; 901/1, 27–31
See application file for complete search history.

(56) References Cited

U.S. PATENT DOCUMENTS

| 6,251,678 | B1 | 6/2001 | Mach et al. |
| 6,908,613 | B2 | 6/2005 | Wilson et al. |

FOREIGN PATENT DOCUMENTS

| DE | 43 32 596 | 3/1995 |
| JP | 62-78287 U | 5/1987 |
| JP | 5031689 A | 2/1993 |
| JP | 06-170772 A | 6/1994 |
| JP | 7 332944 | 12/1995 |
| JP | 9047992 A | 2/1997 |
| JP | 10-264068 A | 10/1998 |
| JP | 2004-238147 | * 8/2004 |
| JP | 2004-238147 A | 8/2004 |

(Continued)

OTHER PUBLICATIONS

Bachtiary, B. et al, Impact of multiple HPV infection on response to treatment and survival in pts. receiving radical radiotherapy for cervical cancer, International Journal of Cancer, Journal International Du Cancer, US, Nov. 20, 2002, vol. 102, No. 3, pp. 237-243.

(Continued)

*Primary Examiner*—Kim T Nguyen
(74) *Attorney, Agent, or Firm*—Lowe Hauptman Ham & Berner, LLP (57) ABSTRACT

A hand as an end effector. The hand includes a base, a hook element associated with the base and capable of hooking and lifting an object, a holding element associated with the base and cooperating with the hook element to hold the object therebetween, and a drive section causing a relative movement between the hook element and the holding element. For example, the hook element is arranged movably in a direction toward and away from the holding element on the base, and the drive section drives the hook element. Alternatively, the holding element is arranged movably in a direction toward and away from the hook element on the base, and the drive section drives the holding element. A handling robot includes an arm and the above-described hand attached to the arm.

4 Claims, 6 Drawing Sheets

FOREIGN PATENT DOCUMENTS

| | | |
|---|---|---|
| WO | WO01/17551 | 3/2001 |
| WO | WO01/97840 | 12/2001 |

OTHER PUBLICATIONS

Balsley, J.F. et al, Progress in the development of human papillomavirus vaccines for HPV-11 and HPV-16/18 and mapping of a critical neutralizing epitope, 18th International Papillomavirus Conference 2000, Online 2000, XP002278802, Retrieved from Internet:www.hpv2000.com/idabstract.asp, retrieved on May 3, 2004.

Bass, E. et al, Progress in the search of a vaccine against human papilloma virus, IAVI Report Oct./Nov. 2002, Online, Oct. 10, 2002, retrieved from the internet—www.aegis.com/pubs/iavi/2002/IAVI2002-1003.html, retrieved on Apr. 21, 2004.

Brown, D.R. et al, A dose ranging study of the safety and immunogenicity profiles of a quadrivalent HPV (types 6, 11, 16 and 18) L1 VLP candidate vaccine in young healthy women, Abstract 0-51, 19th International Papillomavirus Conference, Sep. 2001, Florianopolis, Brazil.

Christensen, N.D., et al., Monoclonal Antibodies to HPV-6 L1 Virus-Like Particles Identify Comformational and Linear Neutralizing Epitopes on HIV-11 in Addition to Type-Specific Epitopes on HPV-6, Virology, 1996, vol. 224, pp. 477-486.

Combita, Alba-Lucia et al, Identification of two cross-neutralizing linear epitopes within the L1 major capsid protein of human papillomaviruses, Journal of Virology, US, vol. 76, No. 13, Jul. 2002, pp. 6480-6486.

Schiller, J.T. et al, Papillomavirus-like particle base vaccines: cervical cancer and beyond, Expert Opinion on Biological Therapy, Ashley, London, GB, vol. 1, No. 4, Jul. 2001 (2001-2007), pp. 571-581.

Steller, M.A. Cervical cancer vaccines: progress and prospects, Journal of the Society for Gynecologic Investigation, US, Sep., Oct. 2002, vol. 9, No. 5, Sep. 2002 (2002-2009), pp. 254-264.

Villa, L. et al, A dose-ranging safety and immunogenicity study of a quadrivalent HPV(type 6/11/16/18) L1 VLP vaccine in women, HPV Clinical Workshop & 20th International Papillomavirus Conference 2002, Oct. 4-9, 2002, Paris, Institute Pasteur.

White, W.I., et al., In Vitro Infection and Type-Restricted Antibody-Mediated Neutralization of Authentic Human Papillomavirus Type 16, Journal of Virology, Feb. 1998, vol. 72, No. 2, pp. 959-964.

Notice of Reasons for Rejection mailed Jul. 31, 2007 for JP2005-058810.

European Search Report of the corresponding European Patent Application, EP06004033, from the European Patent Office dated Jun. 1, 2006.

* cited by examiner

HAND AND HANDLING ROBOT

RELATED APPLICATIONS

The present application is based on, and claims priority from, Japanese Application Number 2005-058810, filed Mar. 3, 2005, the disclosure of which is hereby incorporated by reference herein in its entirety.

BACKGROUND OF THE INVENTION

1. Field of the Invention

The present invention relates to a hand provided as an end effector in a robot. The invention also relates to a handling robot equipped with such a hand.

2. Description of the Related Art

Hands having various configurations, each of which is attached, as an end effector, to the end of a robot arm, are known. The conventional hands can be roughly classified, in terms of the mechanical configuration thereof, into three types; such as a mechanical hand including a plurality of (generally, two or three) rigid fingers for gripping an object having a specified shape, a specific hand for holding an object having a specified structure by vacuum or magnetic adsorption, and a multi-finger hand (or a universal hand) for gripping an object having an optional shape by various operations of a plurality of (generally, two to five) finger mechanisms, each having a joint.

Also, a robot (generally referred to as a handling robot) using a hand attached to the end of an arm and carrying out various handling works for workpieces, such as loading/unloading, palletizing/depalletizing or pick-and-place, is known. For example, Japanese Unexamined Patent Publication (Kokai) No. 7-332944 (JP-A-7-332944) discloses a handling robot performing a handling work for a cast product placed on a pallet by using a mechanical hand including two parallel openable/closable fingers. JP-A-7-332944 also discloses a crane apparatus by which a coil for steel-manufacturing use, placed in a coil yard, is lifted and transported with a vertically movable hook member.

Among various types of hands described above, the mechanical hand is comparatively simple in configuration and easy to control and, therefore, tends to be widely used for the handling robot. In the conventional mechanical hand, however, the shape of the rigid fingers and the gripping operation mode thereof are configured to be adaptable to the attributes of a specified object to be gripped, such as dimensions, shape and weight, so that it is generally difficult to grip objects having different attributes by a mechanical hand having a common structure.

Also, it is sometimes difficult, for the handling robot equipped with the mechanical hand (as described in, e.g., JP-A-7-332944), to pick out a desired workpiece from a plurality of workpieces having the same attribute, which are randomly placed in various orientations in a pallet or container. Generally, the workpieces randomly placed (e.g., stacked-up) assume a variety of orientations different from an orientation desired by the robot, so that, even when the arm is variously operated, the interference between the hand or arm and the surrounding objects such as other workpieces may occur, which may make it difficult to grip a predetermined grippable portion of the workpiece. In an attempt to grip each workpiece on a portion thereof able to be actually gripped, the hand is required to be changed to the other one having a structure corresponding to the actually grippable part at every time of gripping, which results in an increased cost and cycle time for a handling work.

On the other hand, the crane apparatus, such as that described in JP-A-7-332944, can operate to scoop up an object (or a coil) with a hook member, so that it is not required to set a specified grippable portion on the object to be transported. In some applications, therefore, it is facilitated to pick out a desired object from a plurality of randomly placed objects, in comparison with a picking work by a robot having a mechanical hand. However, the object scooped up by the hook member is not stably held on the hook member, so that it is required to maintain a transporting speed at slow rate, so as to prevent the object from falling off. Further, as compared with the mechanical hand, it is difficult for the hook member to accurately position and place an object at a predetermined location.

SUMMARY OF THE INVENTION

It is an object of the present invention to provide a hand, as an end effector, with a simple and easily controllable configuration, which can stably grip various objects having different attributes, such as dimensions, shapes and weights, and can readily pick out a desired object from a plurality of randomly placed objects, and thereby making it possible to reduce the cost and cycle time for a robot handling work.

Another object of the invention is to provide a handling robot equipped with a hand, in which various objects having different attributes, such as dimensions, shapes and weights, can be stably gripped by the hand, and a desired object can be readily picked out from a plurality of randomly placed objects, and thereby making it possible to reduce the cost and cycle time for a handling work.

To accomplish the above object, the present invention provides a hand as an end effector, comprising a base; a hook element associated with the base, and capable of hooking and lifting an object; a holding element associated with the base, and cooperating with the hook element to hold the object therebetween; and a drive section causing a relative movement between the hook element and the holding element.

In the above hand, the hook element may be arranged movably in a direction toward and away from the holding element on the base; and the drive section may drive the hook element.

Alternatively, the holding element may be arranged movably in a direction toward and away from the hook element on the base; and the drive section may drive the holding element.

The present invention also provides a handling robot, comprising an arm; and a hand, as set forth above, attached to the arm.

BRIEF DESCRIPTION OF THE DRAWINGS

The above and other objects, features and advantages of the present invention will become more apparent from the following description of preferred embodiments in connection with the accompanying drawings, wherein.

DETAILED DESCRIPTION

The embodiments of the present invention are described below in detail, with reference to the accompanying drawings. In the drawings, the same or similar components are denoted by common reference numerals.

Figure 1:
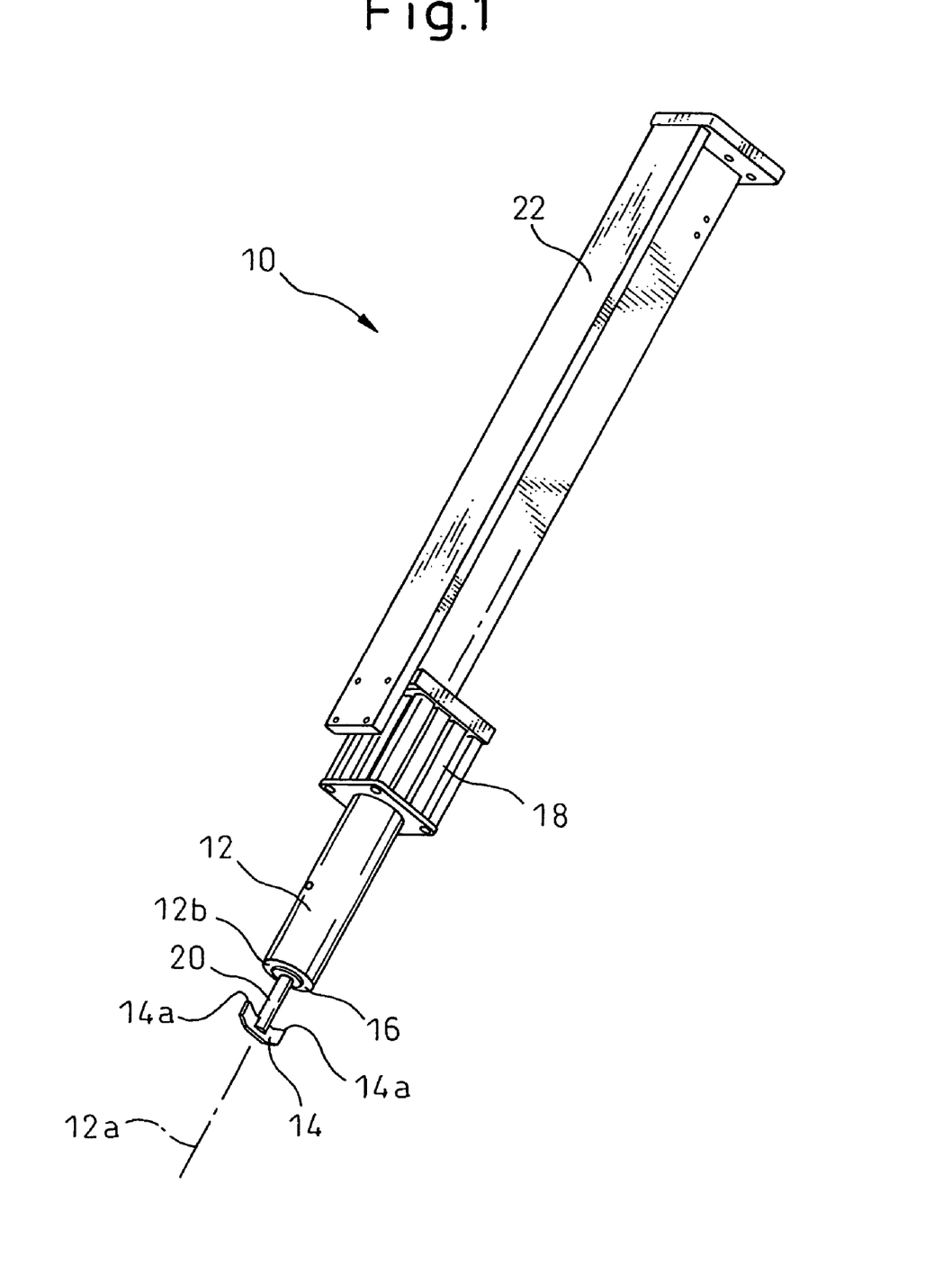
FIG. 1 is a perspective view showing a hand according to a first embodiment of the present invention.

Referring to the drawings, FIG. 1 shows a hand 10 according to a first embodiment of the present invention. The hand 10 is an end effector adapted to be attached for use to the end of a robot arm (not shown), and includes a base 12, a hook element 14 associated with the base 12 and capable of hooking and lifting an object, a holding element 16 associated with the base 12 and cooperating with the hook element 14 to hold the object therebetween, and a drive section 18 causing a relative movement between the hook element 14 and the holding element 16. In the illustrated embodiment, the hook element 14 is arranged movably in a direction toward and away from the holding element 16 on the base 12.

The base 12 is formed from a cylindrical member having a longitudinal axis 12a, and is provided at the side of a first axial end thereof with the hook element 14 and the holding element 16, in such a positional correlation as to be spaced from and substantially opposed to each other in an axial direction, and at the side of a second opposite axial end thereof with the drive section 18 for driving the hook element 14. The base 12 is a rigid element not readily deformable under an external force, and, for example, is formed integrally with or fixedly joined to, as an independently formed member, a cylinder member (not shown) of a hydraulic or pneumatic cylinder unit as the drive section 18.

A shaft 20 formed from a linear rod member is received in the base 12 coaxially with and movably along the longitudinal axis 12a. The shaft 20 is a rigid element not readily deformable under an external force, and, for example, is formed integrally with or fixedly joined to, as an independently formed member, a piston member (not shown) of the hydraulic or pneumatic cylinder unit as the drive section 18.

The shaft 20 is arranged in such a manner that a required length thereof extends outward from the first axial end of the base 12 and is disposed along the longitudinal axis 12a, with the hook element 14 being provided at the axial distal end of the outwardly extending length. Consequently, the base 12 and the hook element 14 establish therebetween a correlation allowing a linear reciprocating motion relative to each other through the drive section 18 and the shaft 20. The hook element 14 has an anchor shape projecting laterally oppositely from the center longitudinal axis 12a at the distal end of the shaft 20, and a pair of tip ends 14a having acute profiles are formed at a side facing to the base 12. The hook element 14 is a rigid element not readily deformable under an external force, and is formed integrally with or fixedly joined to, as an independently formed member, the shaft 20.

The base 12 is provided at the first axial end thereof with a generally flat annular end face 12b extending generally orthogonally to the longitudinal axis 12a so as to surround the shaft 20. The annular end face 12b of the base 12 functions as the holding element 16 cooperating with the hook element 14 under the operation of the drive section 18, and is arranged to be substantially opposed to and spaced by a variable distance from the tip ends 14a of the hook element 14. Consequently, the base 12 and the holding element 16 establish therebetween a correlation not allowing a relative motion. The base 12 is also provided at the second axial end thereof with a mounting member 22 for mounting the hand 10 on the robot arm (not shown), with the drive section 18 interposed therebetween in the illustrated embodiment.

The drive section 18 is preferably formed from a pneumatic cylinder unit, and is configured to linearly drive the shaft 20, with the hook element 14 attached to the distal end of the shaft, along the longitudinal axis 12a, so as to shift the hook element 14 on the base 12 in a direction toward or away from the holding element 16. In this connection, a hydraulic cylinder unit, a solenoid, an electric motor, and so on, may alternatively be used as the drive section 18. The operation of the drive section 18 may be controlled by, e.g., the control section (not shown) of the robot equipped with the hand 10.

Figure 2A:
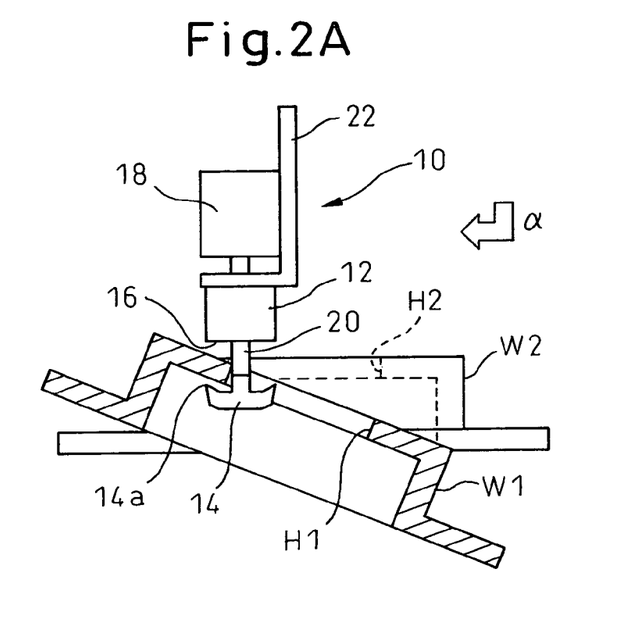
FIG. 2A is an illustration showing a hooking step in a sequence of a holding operation by the hand of FIG. 1.
Figure 2B:
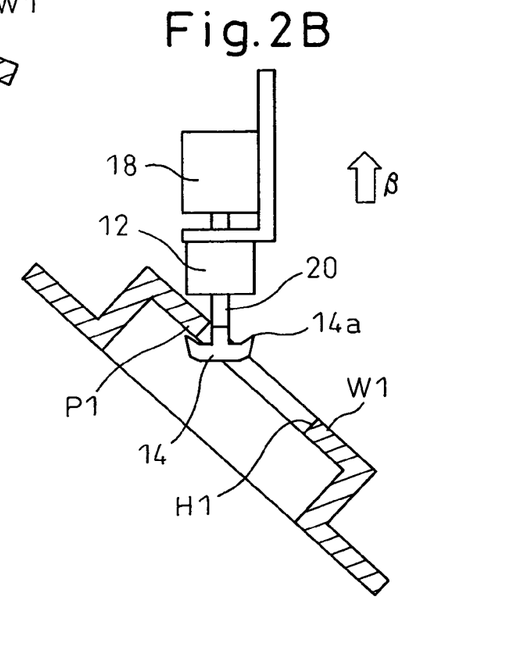
FIG. 2B is an illustration showing a lifting step in the holding operation.
Figure 2C:
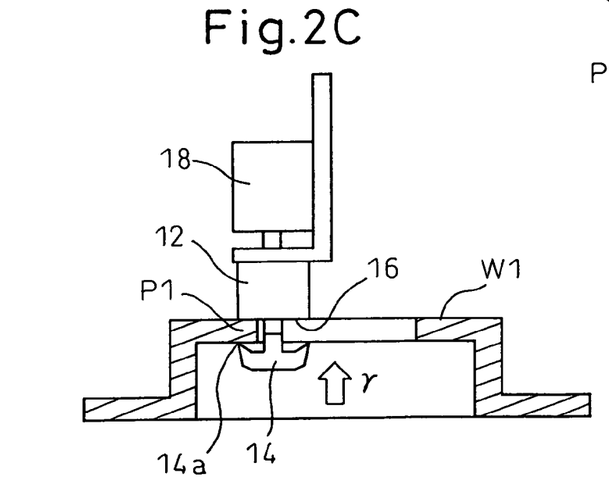
FIG. 2C is an illustration showing a holding step in the holding operation.

An example of a holding or gripping operation by the hand 10 having the above configuration is now described with reference to FIGS. 2A to 2C. FIGS. 2A to 2C show by way of example the holding operation of the hand 10, in which a desired workpiece is picked out from a plurality of workpieces W1, W2, . . . having the same attribute, respectively provided with center openings H1, H2, . . . and randomly placed in various orientations.

First, the robot arm (not shown) is operated, so as to insert the hook element 14 of the hand 10 into the center opening H1 of the desired workpiece W1 selected from the several workpieces W1, W2, . . . (shown by an arrow a in FIG. 2A). In this step, if the center openings H1, H2, . . . of the workpieces W1, W2, . . . are sufficiently exposed, it is possible to insert the hook element 14 into any center opening H1, H2, . . . , while maintaining the hand 10 in a certain orientation as illustrated, regardless of the orientation of each of the laid or stacked workpieces W1, W2, . . . . In this connection, to facilitate the insertion of the hook element 14, it is preferred that the drive section 18 is previously operated to drive the shaft 20 to extend from the base 12 by a required length, so as to ensure a required space between the hook element 14 and the holding element 16.

Next, one tip end 14a of the hook element 14 is operated to hook thereon the peripheral region P1 defining the center opening H1 of the workpiece W1, and the robot arm is operated to lift up the workpiece W1 without operating the drive section 18 (shown by an arrow β in FIG. 2B). During this step, the workpiece W1 is automatically displaced into a balanced orientation, due to gravity, with its own center of gravity being located substantially vertically beneath the hook element 14. This balanced orientation is substantially identical for all of the workpieces W1, W2, . . . having the same attribute. Thus, according to the hand 10, the hook element 14 is first operated to hook and lift up any one of the randomly placed workpieces W1, W2, . . . , whereby it is possible to automatically establish a constant positional correlation between the hand 10 and the workpiece W1, W2, . . . due to gravity.

Thereafter, the robot arm is operated, so as to shift the workpiece W1 to a position free of interference with the other workpieces W2, . . . . At this position, the drive section 18 is operated to drive the shaft 20 to be retracted into the base 12, so as to shift the hook element 14 in a direction toward the holding element 16 (shown by an arrow γ in FIG. 2C). As a result, the peripheral region P1 of the workpiece W1 is held between the tip end 14a of the hook element 14 and the holding element 16 under a pressure exerted by the drive section 18. During this step, the workpiece W1 is automatically displaced into a predetermined held orientation (a horizontal orientation, in the drawing) while depending on the correlative shapes of the holding element 16 of the hand 10 and of the surface of the workpiece W1 contacted with the holding element 16. This held orientation is substantially identical for all of the workpieces W1, W2, . . . having the same attribute.

In this manner, the workpiece W1 held between the hook element 14 and the holding element 16 is stably and firmly gripped by the hand 10, under the pressure exerted by the drive section 18. Therefore, it is possible to eliminate the risk of the workpiece W1 falling from the hand 10, and thus to operate the robot arm at high speed. It should be understood that the hand 10 can stably grip any of various workpieces having different attributes, such as dimensions, shapes or weights, provided that the workpiece has a portion, similar to the peripheral region P1 of the workpiece W1 as illustrated, adapted to be hooked by the hook element 14 and to be held between the hook element 14 and the holding element 16.

As described above, the hand 10 employs a simple configuration in which the hook element 14 is moved relative to the holding element 16 under the control of the single drive section 18, and thus has an advantage such that the production cost can be suppressed and the control of the gripping operation is facilitated. Also, the hand 10 is configured to first hook an object on the hook element 14 and lift the object by the operation of the robot arm, unlike the conventional mechanical hand, and thus can relatively easily pick various objects having different attributes, such as dimensions, shapes or weights, or objects placed in various orientations, without being restricted by a predetermined grippable portion (i.e., without adjusting the hand orientation). Further, the hand 10 is configured such that the object hooked on the hook element 14 is automatically displaced into a specified position relative to the hand 10 due to gravity, and thereafter that the hook element 14 is driven to press the object against the holding element 16 for holding the object, so that it is possible to stably and firmly grip the object in an appropriate orientation. Accordingly, when the hand 10 is attached to the robot arm to perform the handling work, it becomes unnecessary to provide several different types of hands having different structures and, as a result, it is possible to effectively reduce the cost and cycle time for the robot handling work.

Figure 3:
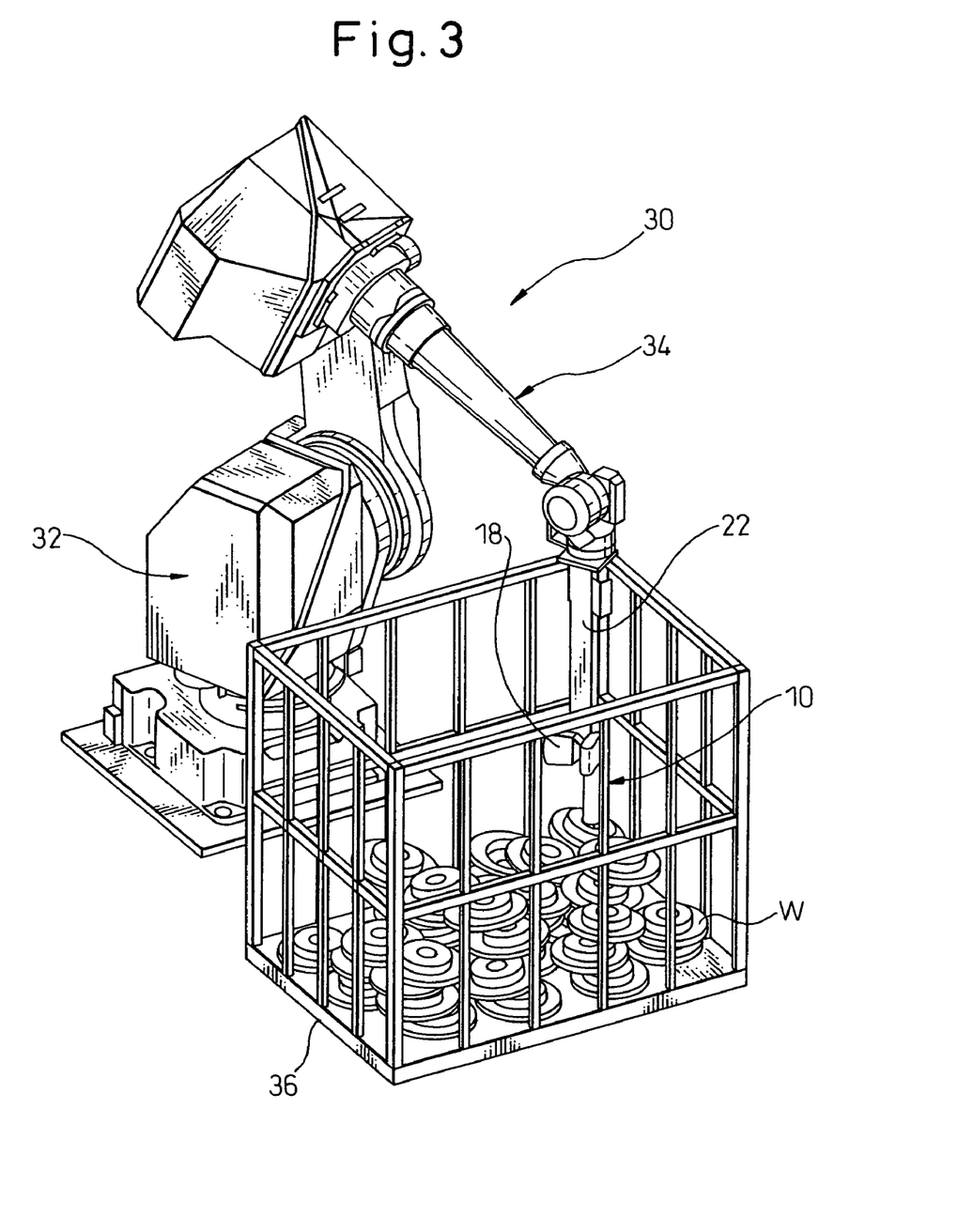
FIG. 3 is a perspective view schematically showing a handling robot equipped with the hand of FIG. 1, according to an embodiment of the present invention, together with a workpiece.

FIG. 3 shows a handling robot 30 equipped with the above-described hand 10, according to an embodiment of the present invention. The handling robot 30 includes a manipulator 32 having a vertically articulated configuration, and the hand 10 as an end effector is attached through the mounting member 22 at the end (or a wrist) of an arm 34 of the manipulator 32. The handling robot 30 can operate the manipulator 32 in various ways so as to place the hand 10 at desired position and orientation under the control of a control section (not shown), and can operate the drive section 18 of the hand 10 so as to grip a desired object in the hand 10 preferably under the control of the same control section. The drive section 18 of the hand 10 is supplied with, e.g., a working air through a supply conduit (not shown) from a working air source (not shown).

The handling robot 30 can easily pick out a desired workpiece W from a plurality of workpieces W accommodated randomly in a container 36 with a comparatively large depth as shown by way of example. The workpiece picking-out operation by the handling robot 30, in connection with FIG. 3, is described with reference to FIGS. 4A to 4C. As an assumption, the workpieces W having the same attribute and provided respectively with center openings H are placed randomly in various orientations in the container 36. The gripping operation of the hand 10 is also assumed to be substantially the same as the operation described with reference to FIGS. 2A to 2C.

Figure 4A:
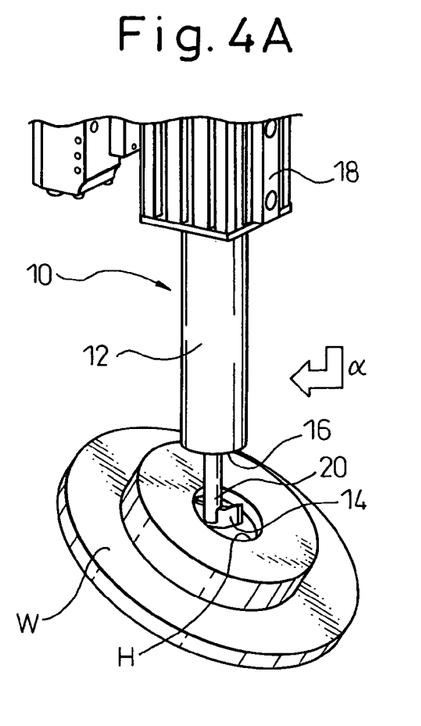
FIG. 4A is an illustration showing a hooking step in a sequence of a workpiece picking-out operation by the handling robot of FIG. 3.

First, the manipulator 32 (FIG. 3) is operated, so as to insert the hook element 14 of the hand 10 into the center opening H of the desired workpiece W selected from the several workpieces H (shown by an arrow α in FIG. 4A). In this step, if the center opening H of the workpiece W is sufficiently exposed, it is possible to insert the hook element 14 into the center opening H, while maintaining the hand 10 in a certain orientation as shown in FIG. 3 (a vertical orientation in the drawing), regardless of the orientation of the laid workpiece W.

Figure 4B:
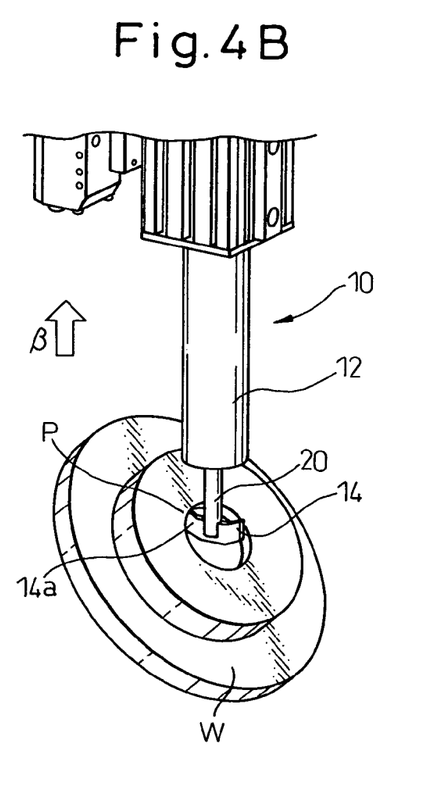
FIG. 4B is an illustration showing a lifting step in the workpiece picking-out operation.
Figure 4C:
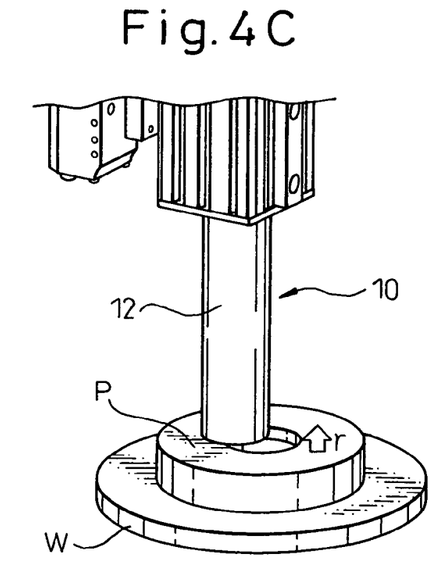
FIG. 4C is an illustration showing a holding step in the workpiece picking-out operation.

Next, one tip end 14a of the hook element 14 is operated to hook thereon the peripheral region P defining the center opening H of the workpiece W, and the manipulator 32 is operated to lift up the workpiece W without operating the drive section 18 (shown by an arrow β in FIG. 4B). During this step, the workpiece W is automatically displaced into a balanced orientation as illustrated, due to gravity, with its own center of gravity being located substantially vertically beneath the hook element 14.

Thereafter, the manipulator 32 is operated, so as to shift the workpiece W to a position free of the interference with the other workpieces W. At this position, the drive section 18 is operated to drive the shaft 20 to be retracted into the base 12, so as to shift the hook element 14 in a direction toward the holding element 16 (shown by an arrow γ in FIG. 4C). As a result, the peripheral region P of the workpiece W is firmly and stably held between the hook element 14 and the holding element 16 under a pressure exerted by the drive section 18. Under this condition, the manipulator 32 is operated to transport the workpiece W to a desired position out of the container 36. In this step, it is possible to eliminate the risk of the workpiece W falling from the hand 10, and thus to operate the manipulator 32 at high speed.

In this connection, in the case where the desired workpiece W is picked out from the workpieces W placed at random in the container 36 as shown in FIG. 3 by using a handling robot equipped with the conventional mechanical hand, it is required that a manipulator is variously operated to change the hand orientation so as to permit the rigid fingers of the hand to grip a predetermined grippable portion on the workpiece W (e.g., inner and outer peripheral edges of an annular portion defining the center opening H). In this step, however, the hand or arm may interfere with the other workpieces W or the container 36, which may result in a situation in which the predetermined grippable portion on the workpiece W cannot be gripped. Contrary to this, with the handling robot 30 according to the present invention, it is possible, by using the hand 10 as described above, to relatively easily pick out the desired workpiece W from the several workpieces W placed at random in the container 36, without being restricted by a predetermined grippable portion (i.e., without adjusting the orientation of the hand 10). Further, the use of the hand 10 makes it possible to stably and firmly grip various objects having different attributes, such as dimensions, shapes or weights, in an appropriate orientation. Therefore, according to the handling robot 30, it is possible to effectively reduce the cost and cycle time for the handling work.

Figure 5:
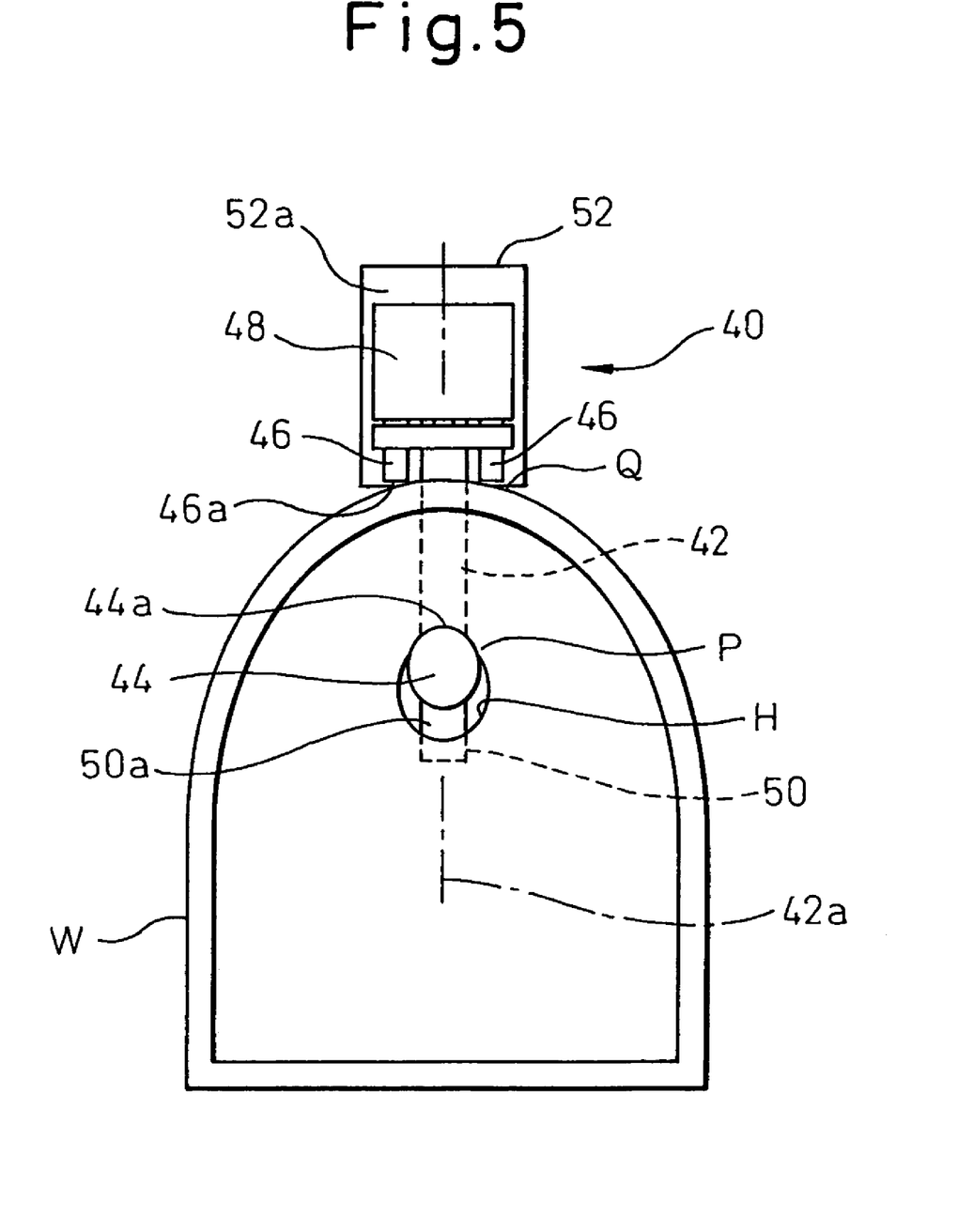
FIG. 5 is a front view showing a hand according to a second embodiment of the present invention, together with a workpiece.

FIG. 5 schematically shows a hand 40, according to a second embodiment of the present invention, together with a workpiece W to be gripped. The hand 40 is an end effector adapted to be attached for use to the end of a robot arm (not shown), and includes a base 42, a hook element 44 associated with the base 42 and capable of hooking and lifting an object, a holding element 46 associated with the base 42 and cooperating with the hook element 44 to hold the object therebetween, and a drive section 48 causing a relative movement between the hook element 44 and the holding element 46. In the second embodiment, contrary to the first embodiment, the holding element 46 is arranged movably in a direction toward and away from the hook element 44 on the base 42.

The base 42 is a plate-like member having a longitudinal axis 42a, and is provided at the side of a first axial end thereof with the hook element 44 and at the side of a second opposite axial end thereof with the holding element 46 in such a positional correlation as to be spaced from and substantially opposed to the hook element 44 in an axial direction. The base 42 is also provided at the second axial end thereof with the drive section 48 for driving the holding element 46. The base 42 is a rigid element not readily deformable under an external force, and includes a first part 50 for carrying the hook element 44 and a second part 52 for carrying the drive section 48, the parts 50, 52 being formed integrally with, or separately from, each other.

The hook element 44 is fixedly projected from the major surface 50a of the first part 50 of the base 42 in a direction generally orthogonal to the longitudinal axis 42a. Consequently, the base 42 and the hook element 44 establish therebetween a correlation not allowing a relative motion. The hook element 44 has a wedge shape progressively widened as viewed from the major surface 50a of the base first part 50, and a tapered end 44a having an acute profile is formed at a side facing to the holding element 46. The hook element 44 is a rigid element not readily deformable under an external force, and is formed integrally with or fixedly joined to, as an independently formed member, the base 42.

The holding element 46 is comprised of a pair of movable pins 46 extending in a direction generally parallel to the longitudinal axis 42a from the drive section 48 carried on the major surface 52a of the second potion 52 of the base 42. The movable pins 46 are linearly reciprocally moved along the longitudinal axis 42a under the driving operation of the drive section 48. Consequently, the base 42 and the holding element 46 establish therebetween a correlation allowing a linear reciprocating motion relative to each other through the drive section 48. The axial end faces 46a of the respective movable pins 46 are arranged to be substantially opposed to and spaced by a variable distance from the tapered end 44a of the hook element 44.

The drive section 48 is preferably formed from a pneumatic cylinder unit, and is configured to linearly drive the pair of movable pins (or the holding element) 46 along the longitudinal axis 42a, so as to shift the movable pins (or the holding element) 46 on the base 42 in a direction toward or away from the hook element 44. In this connection, a hydraulic cylinder unit, a solenoid, an electric motor, and so on, may alternatively be used as the drive section 48. The operation of the drive section 48 may be controlled by, e.g., the control section (not shown) of the robot equipped with the hand 40.

Figure 6A:
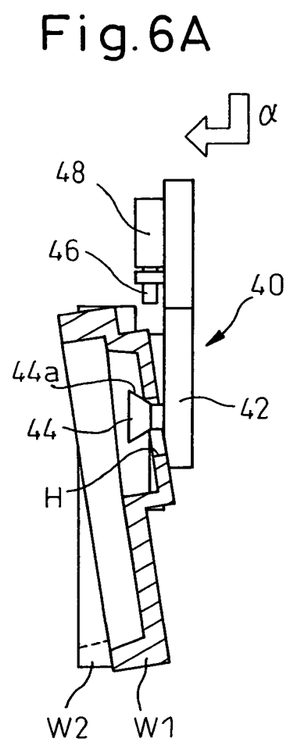
FIG. 6A is an illustration showing a hooking step in a sequence of a holding operation by the hand of FIG. 5.
Figure 6B:
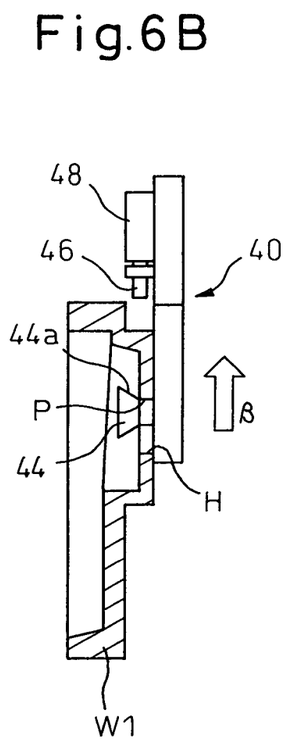
FIG. 6B is an illustration showing a lifting step in the holding operation.
Figure 6C:
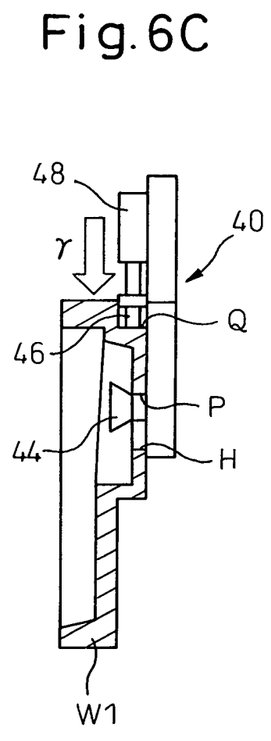
FIG. 6C is an illustration showing a holding step in the holding operation.

An example of a holding or gripping operation by the hand 40 having the above configuration is now described with reference to FIGS. 6A to 6C. FIGS. 6A to 6C show by way of example the holding operation of the hand 40, in which a desired workpiece is picked out from a plurality of workpieces W1, W2, . . . having the same attribute, respectively provided with openings H and randomly placed in various orientations.

First, the robot arm (not shown) is operated, so as to insert the hook element 44 of the hand 40 into the opening H of the desired workpiece W1 selected from the several workpieces W1, W2, . . . (shown by an arrow a in FIG. 6A). In this step, if the openings H of the workpieces W1, W2, . . . are sufficiently exposed, it is possible to insert the hook element 44 into any opening H, while maintaining the hand 40 in a certain orientation as illustrated, regardless of the orientation of each of the laid or stacked workpieces W1, W2, . . . . In this connection, to facilitate the insertion of the hook element 44, it is preferred that the drive section 48 is previously operated to drive the pair of movable pins (or the holding element) 46 to be retracted to a minimum projecting position, so as to ensure a required space between the hook element 44 and the movable pins (or the holding element) 46.

Next, the tapered end 44a of the hook element 44 is operated to hook thereon the peripheral region P defining the opening H of the workpiece W1, and the robot arm is operated to lift up the workpiece W1 without operating the drive section 48 (shown by an arrow β in FIG. 6B). During this step, the workpiece W1 is automatically displaced into a balanced orientation, due to gravity, with its own center of gravity being located substantially vertically beneath the hook element 44. This balanced orientation is substantially identical for all of the workpieces W1, W2, . . . having the same attribute. Thus, according to the hand 40, the hook element 44 is first operated to hook and lift up any one of the randomly placed workpieces W1, W2, . . . , whereby it is possible to automatically establish a constant positional correlation between the hand 40 and the workpiece W1, W2, . . . due to gravity.

Thereafter, the robot arm is operated to shift the workpiece W1 to a position free of interference with the other workpieces W2, . . . . At this position, the drive section 48 is operated to drive the pair of movable pins (or the holding element) 46 to shift in a direction toward the hook element 44 (shown by an arrow γ in. FIG. 6C). As a result, the peripheral region P and the opposite outer surface region Q of the workpiece W1 are held between the tapered end 44a of the hook element 44 and the pair of movable pins (or the holding element) 46 under a pressure exerted by the drive section 48. During this step, the workpiece W1 is automatically displaced into a predetermined held orientation (a horizontal orientation, in the drawing) while depending on the correlative shapes of the pair of movable pins (or the holding element) 46 of the hand 40 and of the outer surface region Q of the workpiece W1 contacted with the movable pins (or the holding element) 46. This held orientation is substantially identical for all of the workpieces W1, W2, . . . having the same attribute.

In this manner, the workpiece W1 held between the hook element 44 and the holding element 46 is stably and firmly gripped by the hand 40 under the pressure exerted by the drive section 48. Therefore, it is possible to eliminate the risk of the workpiece W1 falling from the hand 40, and thus to operate the robot arm at high speed. It should be understood that the hand 40 can stably grip any of various workpieces having different attributes, such as dimensions, shapes or weights, provided that the workpiece has portions, similar to the peripheral region P and the outer surface region Q of the workpiece W1 as illustrated, adapted to be hooked by the hook element 44 and to be held between the hook element 44 and the holding element 46.

As described above, the hand 40 has a simple and easily controllable configuration, can stably grip various objects having different attributes, such as dimensions, shapes and weights, and can readily pick out a desired object from a plurality of randomly placed objects, similar to the hand 10 as previously described. Therefore, the hand 40 makes it possible to effectively reduce the cost and cycle time for a robot handling work. It should be understood that the hand 40 can be attached for use, in place of the hand 10, to the distal end of the arm 34 of the handling robot 30 shown in FIG. 3.

As will be apparent from the above description, in the hand according to the present invention, a simple configuration is employed, in which the drive section merely drives the hook element and the holding element to be moved relative to each other, so that it is possible to suppress the production cost of the hand and facilitate the control of the gripping operation. Also, the inventive hand is configured to first hook the object on the hook element and lift the object, and thus can relatively easily pick various objects having different attributes, such as dimensions, shapes or weights, or objects placed in various orientations, without being restricted by a predetermined grippable portion on the object (i.e., without adjusting the hand orientation). Further, the object hooked on the hook element is automatically displaced into a specified position relative to the hand due to gravity and, therefore, by controlling the holding operation to hold the object between the hook element and the holding element, it is possible to stably and firmly grip the object in an appropriate orientation. Accordingly, when the inventive hand is attached to the robot arm to perform the handling work, it becomes unnecessary to provide several different types of hands having different structures and, as a result, it is possible to effectively reduce the cost and cycle time for the robot handling work.

Further, the inventive hand may be configured such that the drive section drives either one of the hook element or the holding element, in consideration of the application of the hand (e.g., the constitution of an object to be gripped), which can further simplify the configuration of the hand and further ease the control of the gripping operation.

With the handling robot according to the present invention, it is possible, by using the hand having the above-described features, to relatively easily pick out the desired workpiece from the several workpieces placed at random in various orientations, without being restricted by a predetermined grippable portion (i.e., without adjusting the orientation of the hand). Further, the use of the above-described hand makes it possible to stably and firmly grip various objects having different attributes, such as dimensions, shapes or weights, in an appropriate orientation. Therefore, it is possible to effectively reduce the cost and cycle time for the handling work.

While the invention has been described with reference to specific preferred embodiments, it will be understood, by those skilled in the art, that various changes and modifications may be made thereto without departing from the scope of the following claims.

The invention claimed is:

1. A hand as an end effector, comprising:
   a base;
   a hook element associated with said base, and capable of hooking and lifting an object;
   a holding element associated with said base, and cooperating with said hook element to hold said object therebetween; and
   a drive section causing a relative linear movement between said hook element and said holding element;
   wherein said hook element includes an end adapted to hook an object thereon, and allows the object to be automatically displaced into a balanced orientation, due to gravity, with a center of gravity of the object being located substantially vertically beneath said hook element, when said hook element hooks on and lifts the object without an operation of said drive section; and
   wherein said hook element and said holding element are adapted to be relatively shifted in a direction toward each other by an operation of said drive section, and hold the object between said end of said hook element and said holding element under a pressure exerted by said drive section.

2. A hand as set forth in claim 1,
   wherein said hook element is arranged movably in a direction toward and away from said holding element on said base; and
   wherein said drive section drives said hook element.

3. A hand as set forth in claim 1,
   wherein said holding element is arranged movably in a direction toward and away from said hook element on said base; and
   wherein said drive section drives said holding element.

4. A handling robot, comprising: an arm; and a hand, as set forth in claim 1, attached to said arm.

* * * * *